(12) United States Patent
Jiang

(10) Patent No.: US 11,838,773 B2
(45) Date of Patent: Dec. 5, 2023

(54) LBT FAILURE PROCESSING METHOD AND LBT FAILURE PROCESSING APPARATUS

(71) Applicant: BEIJING XIAOMI MOBILE SOFTWARE CO., LTD., Beijing (CN)

(72) Inventor: Xiaowei Jiang, Beijing (CN)

(73) Assignee: BEIJING XIAOMI MOBILE SOFTWARE CO., LTD., Beijing (CN)

(*) Notice: Subject to any disclaimer, the term of this patent is extended or adjusted under 35 U.S.C. 154(b) by 302 days.

(21) Appl. No.: 17/422,872

(22) PCT Filed: Jan. 16, 2019

(86) PCT No.: PCT/CN2019/072006
§ 371 (c)(1),
(2) Date: Jul. 14, 2021

(87) PCT Pub. No.: WO2020/147042
PCT Pub. Date: Jul. 23, 2020

(65) Prior Publication Data
US 2022/0070698 A1  Mar. 3, 2022

(51) Int. Cl.
*H04W 24/04* (2009.01)
*H04W 16/14* (2009.01)
*H04W 74/08* (2009.01)

(52) U.S. Cl.
CPC ........... *H04W 24/04* (2013.01); *H04W 16/14* (2013.01); *H04W 74/0808* (2013.01); *H04W 74/0833* (2013.01)

(58) Field of Classification Search
CPC . H04W 24/04; H04W 16/14; H04W 74/0808; H04W 74/0833; H04B 17/382
See application file for complete search history.

(56) References Cited

U.S. PATENT DOCUMENTS

| 2017/0347365 A1 | 11/2017 | Xu et al. |
| 2020/0221495 A1* | 7/2020 | Chen ................ H04W 74/0808 |
| 2020/0229241 A1* | 7/2020 | Jeon ................. H04W 74/0833 |

(Continued)

FOREIGN PATENT DOCUMENTS

| CN | 105282855 A | 1/2016 |
| CN | 105578607 A | 5/2016 |
| CN | 107371168 A * | 11/2017 ............ H04W 16/14 |

(Continued)

OTHER PUBLICATIONS

ISA State Intellectual Property Office of the People's Republic of China, Written Opinion of the International Searching Authority Issued in Application No. PCT/CN2019/072006, dated Jul. 1, 2019, WIPO, 9 pages.

(Continued)

*Primary Examiner* — Shailendra Kumar
(74) *Attorney, Agent, or Firm* — SYNCODA LLC; Feng Ma (57) ABSTRACT

A method of processing a listen before talk (LBT) failure can be applied to a terminal and include: counting a number of failures and a number of successes for performing LBTs; determining whether to trigger a preset action according to a relationship between the number of failures and the number of successes, wherein the preset action is used to restore a link between the terminal and a base station or report a link problem to the base station.

18 Claims, 4 Drawing Sheets

--- for each time of uplink operation, count the number of failures and the number of successes for performing LBT — S12 for different times of uplink operations, respectively determine whether to trigger the preset action according to the relationship between the number of failures and the number of successes — S26

(56) References Cited

U.S. PATENT DOCUMENTS

2021/0212112 A1* 7/2021 Jia .......................... H04W 24/08

FOREIGN PATENT DOCUMENTS

| CN | 107371168 A | 11/2017 |
|----|-------------|---------|
| CN | 107888256 A | 4/2018 |
| CN | 109155701 A | 1/2019 |
| WO | 2018021783 A1 | 2/2018 |

OTHER PUBLICATIONS

ISA State Intellectual Property Office of the People's Republic of China, International Search Report Issued in Application No. PCT/CN2019/072006, dated Jul. 1, 2019, WIPO, 4 pages.

LG Electronics Inc., "Channel occupancy measurement enhancements for NR-U", 3GPP TSG-RAN WG2 Meeting #104, Spokane, USA, R2-1818328, Nov. 12-16, 2018, 2 pages.

* cited by examiner

LBT FAILURE PROCESSING METHOD AND LBT FAILURE PROCESSING APPARATUS

CROSS-REFERENCE TO RELATED APPLICATIONS

This application is a national stage of International Application No. PCT/CN2019/072006 filed on Jan. 16, 2019, the disclosure of which is hereby incorporated by reference in its entirety.

TECHNICAL FIELD

The present disclosure relates to the field of communication technology, and in particular, to a method of processing an LBT failure and an apparatus for processing an LBT failure, an electronic device, and a computer readable storage medium.

BACKGROUND

In order to expand frequency bands that user equipment and a base station can use for communication, research on unlicensed frequency bands in new radio (NR) is currently in progress, which is to realize communication between the user equipment and the base station on the unlicensed frequency bands based on NR technology.

Before performing uplink transmission on an unlicensed frequency band, the user equipment needs to perform a listen before talk (LBT) on the unlicensed frequency band to detect whether the unlicensed frequency band is idle. Only when the unlicensed frequency band is idle, the user equipment can use the unlicensed frequency band for communicating with the base station. If the unlicensed frequency band is determined to be not idle based on results of multiple LBTs, the communication between the user equipment and the base station may be seriously affected.

SUMMARY

In view of this, the present disclosure provides a method of processing an LBT failure and an apparatus for processing an LBT failure, an electronic device, and a computer readable storage medium to solve the problems in the related art.

According to a first aspect of examples of the present disclosure, a method of processing an LBT failure is provided, which is applicable to a terminal, and includes:

counting a number of failures and a number of successes for performing LBTs;

determining whether to trigger a preset action according to a relationship between the number of failures and the number of successes, wherein the preset action is used to restore a link between the terminal and a base station or report a link problem to the base station.

Optionally, determining whether to trigger the preset action according to the relationship between the number of failures and the number of successes includes:

calculating a first ratio of the number of successes to a sum of the number of failures and the number of successes, wherein in response to that the first ratio is not greater than a first preset ratio, triggering the preset action.

Optionally, determining whether to trigger the preset action according to the relationship between the number of failures and the number of successes includes:

calculating a second ratio of the number of failures to a sum of the number of failures and the number of successes, wherein in response to that the second ratio is not less than a second preset ratio, triggering the preset action.

Optionally, determining whether to trigger the preset action according to the relationship between the number of failures and the number of successes includes:

calculating a first difference value between a product of the number of successes and a first weight and a product of the number of failures and a second weight, wherein in response to that the first difference value is not greater than a first preset difference value, triggering the preset action.

Optionally, determining whether to trigger the preset action according to the relationship between the number of failures and the number of successes includes:

calculating a second difference value between a product of the number of failures and a second weight and a product of the number of success and a first weight, wherein in response to that the second difference value is not greater than a second preset difference value, triggering the preset action.

Optionally, the LBT includes an LBT performed for an uplink operation.

Optionally, a type of the uplink operation includes at least one of the following:

uplink transmitting a scheduling request, random access, uplink transmitting data, uplink feeding back information, uplink transmitting a channel sounding reference signal, or uplink transmitting a channel quality indicator.

Optionally, for different types of uplink operations, counting the number of failures and the number of successes for performing the LBTs includes:

counting, for each type of uplink operation, the number of failures and the number of successes for performing the LBTs;

determining whether to trigger the preset action according to the relationship between the number of failures and the number of successes includes:

determining, for each type of uplink operation, whether to trigger the preset action according to the relationship between the number of failures and the number of successes.

Optionally, for different times of uplink operations, counting the number of failures and the number of successes for performing the LBTs includes:

counting, for each time of uplink operation, the number of failures and the number of successes for performing the LBTs; and determining whether to trigger the preset action according to the relationship between the number of failures and the number of successes includes:

determining, for each time of uplink operation, whether to trigger the preset action according to the relationship between the number of failures and the number of successes.

Optionally, the LBT includes an LBT performed for a downlink operation.

Optionally, the downlink operation at least includes:

downlink transmitting a wireless link monitor reference signal.

Optionally, counting the number of failures and the number of successes for performing the LBTs includes:

counting, within a plurality of time windows for receiving the wireless link monitor reference signal, a first number of time windows in which the wireless link monitor reference signal is not received and a second number of time windows in which the wireless link monitor reference signal is received;

wherein, the first number is determined as the number of failures for performing the LBTs, and the second number is determined as the number of successes for performing the LBTs.

Optionally, the preset action includes at least one of the following:

sending a request to the base station for re-establishing a communication connection, transmitting a report of wireless link failure to the base station, or initiating random access to the base station.

Optionally, counting the number of failures and the number of successes for performing the LBTs includes:

counting a number of failures and a number of successes for performing LBTs within a time window of a preset duration.

Optionally, determining whether to trigger the preset action according to the relationship between the number of failures and the number of successes includes:

determining whether to trigger the preset action according to a relationship between a number of failures and a number of successes for performing LBTs within a first time window closest to a current timing; or determining whether to trigger the preset action according to the relationship between the number of failures and the number of successes for performing the LBTs within the first time window closest to the current timing, and a relationship between a number of failures and a number of successes for performing LBTs within at least one second time window before the first time window.

According to a second aspect of examples of the present disclosure, an apparatus for processing an LBT failure is provided, which is applicable to a terminal, and includes:

a counting module, configured to count a number of failures and a number of successes for performing LBTs;

a triggering determination module, configured to determine whether to trigger a preset action according to a relationship between the number of failures and the number of successes, wherein the preset action is used to restore a link between the terminal and a base station or report a link problem to the base station.

Optionally, the triggering determination module is configured to calculate a first ratio of the number of successes to a sum of the number of failures and the number of successes, wherein in response to that the first ratio is not greater than a first preset ratio, trigger the preset action.

Optionally, the triggering determination module is configured to calculate a second ratio of the number of failures to a sum of the number of failures and the number of successes, wherein in response to that the second ratio is not less than a second preset ratio, trigger the preset action.

Optionally, the triggering determination module is configured to calculate a first difference value between a first product of the number of successes and a first weight and a second product of the number of failures and a second weight, wherein in response to that the first difference value is not greater than a first preset difference value, trigger the preset action.

Optionally, the triggering determination module is configured to calculate a second difference value between a second product of the number of failures and a second weight and a first product of the number of success and a first weight, wherein in response to that the second difference value is not greater than a second preset difference value, trigger the preset action.

Optionally, the LBT includes an LBT performed for an uplink operation.

Optionally, a type of the uplink operation includes at least one of the following:

uplink transmitting a scheduling request, random access, uplink transmitting data, uplink feeding back information, uplink transmitting a channel sounding reference signal, or uplink transmitting a channel quality indicator.

Optionally, for different types of uplink operations, the counting module is configured to, count, for each type of uplink operation, the number of failures and the number of successes for performing the LBTs; and the triggering determination module is configured to, determine, for each type of uplink operation, whether to trigger the preset action according to the relationship between the number of failures and the number of successes.

Optionally, for different times of uplink operations, the counting module is configured to, count for each time of uplink operation, the number of failures and the number of successes for performing the LBTs; and the triggering determination module is configured to, determine, for each time of uplink operation, whether to trigger the preset action according to the relationship between the number of failures and the number of successes.

Optionally, the LBT includes an LBT performed for a downlink operation.

Optionally, the downlink operation at least includes:

downlink transmitting a wireless link monitor reference signal.

Optionally, the counting module is configured to, count, within a plurality of time windows for receiving the wireless link monitor reference signal, a first number of time windows in which the wireless link monitor reference signal is not received and a second number of time windows in which the wireless link monitor reference signal is received;

wherein, the first number is determined as the number of failures for performing the LBTs, and the second number is determined as the number of successes for performing the LBTs.

Optionally, the preset action includes at least one of the following:

sending a request to the base station for re-establishing a communication connection, transmitting a report of wireless link failure to the base station, or initiating random access to the base station.

Optionally, the counting module is configured to count a number of failures and a number of successes for performing LBTs within a time window of a preset duration.

Optionally, the triggering determination module is configured to determine whether to trigger the preset action according to a relationship between a number of failures and a number of successes for performing LBTs within a first time window closest to a current timing; or determine whether to trigger the preset action according to the relationship between the number of failures and the number of successes for performing the LBTs within the first time window closest to the current timing, and a relationship between a number of failures and a number of successes for performing LBTs within at least one second time window before the first time window.

According to a third aspect of the embodiments of the present disclosure, an electronic device is provided, which includes:

a processor, and memory for storing instructions executable by the processor;

wherein the processor is configured to perform steps in the method of processing an LBT failure according to any of the above embodiments.

According to a fourth aspect according to the embodiments of the present disclosure, there is further provided a computer readable storage medium storing a computer program, wherein the computer program is executed by a processor to perform steps in the method of processing an LBT failure according to any of the above embodiments.

According to the embodiments of the present disclosure, since LBT failure occurs when the unlicensed frequency band is not idle, that is, when the unlicensed frequency band is occupied by other devices, the number of failures for performing LBTs can reflect the condition that the unlicensed frequency band is occupied by other devices. The success for performing LBTs occurs when the unlicensed band is idle, that is, when the unlicensed band is not occupied by other devices, so the number of successes for performing LBTs can reflect the condition that the unlicensed frequency band is not occupied by other devices. Furthermore, according to the relationship between the number of failures and the number of successes, it can be determined whether the unlicensed frequency band is frequently occupied by other devices.

Therefore, it can be determined that whether the unlicensed frequency band is frequently occupied by other devices according to the relationship between the number of failures and the number of successes, and trigger the preset action when the unlicensed frequency band is frequently occupied by other devices. The link between the terminal and the base station is restored or used to report a link problem to the base station. The restoration of the link between the terminal and the base station can enable the terminal to communicate with the base station effectively through the restored link; and reporting the link problem to the base station can enable the base station to learn that there is a problem with the communication link used by the terminal, so that the base station can subsequently restore the link with the terminal, or notify the terminal to establish a communication link with another base station, so that the terminal can communication with the base station effectively. Accordingly, by triggering a preset action, the stability of the communication between the terminal and the base station can be ensured.

BRIEF DESCRIPTION OF THE DRAWINGS

To explain the technical solutions in the embodiments of the present disclosure more clearly, the drawings used in the description of the embodiments will be briefly introduced below. Apparently, the drawings in the following description are only some embodiments of the present disclosure. For those of ordinary skill in the art, other embodiments can be obtained based on these drawings without paying creative labor.

DETAILED DESCRIPTION

The following will clearly and completely describe the technical solutions in the embodiments of the present disclosure with reference to the accompanying drawings in the embodiments of the present disclosure. Apparently, the described embodiments are only disclosure part of the embodiments of the present disclosure, but not all of the embodiments. Based on the embodiments in the present disclosure, all other embodiments obtained by a person of ordinary skill in the art without creative efforts shall fall within the protection scope of the present disclosure.

In the related art, when an unlicensed frequency band is determined to be not idle based on results of multiple LBTs, each time the unlicensed frequency band is determined to be not idle based on a result of an LBT is recorded as an LBT failure. When every LBT fails within a period of time, user equipment may re-establish a communication connection with a base station. However, if one LBT succeeds within the period of time, the user equipment may use the unlicensed frequency band to communicate with the base station instead of re-establishing the communication connection with the base station.

However, if only one LBT succeeds in the period of time and the other LBTs fail, it means that the unlicensed frequency band is frequently occupied. In the case that the only one LBT succeeds, using the unlicensed frequency band to communicate with the base station may lead to instability of the communication (for example, having problems with a high packet loss rate and high delay).

Figure 1:
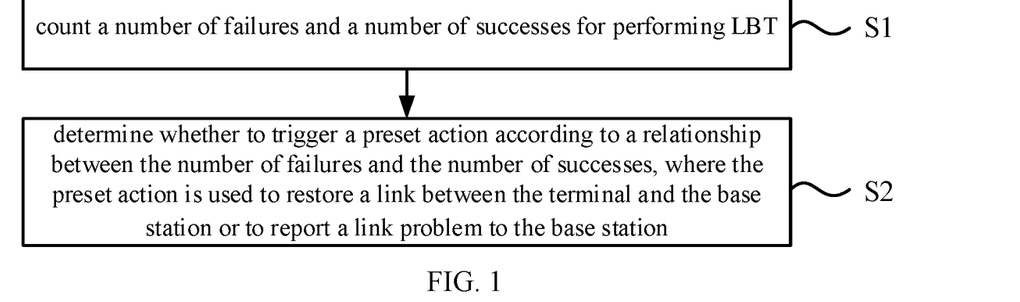
FIG. 1 is a flowchart illustrating a method of processing an LBT failure according to an example of the present disclosure.

FIG. 1 is a flowchart illustrating a method of processing an LBT failure according to an example of the present disclosure. The method of processing the LBT failure according to the example may be applied in a terminal. The terminal may be a mobile, a tablet, a wearable device, and an electronic device, and the terminal may communicate with a base station using NR technology.

As shown in FIG. 1, the method of processing the LBT failure may include the following steps.

At step S1, a number of failures and a number of successes for performing LBTs are counted.

It should be noted that the LBT failure in this embodiment can have different meanings from the LBT failure in the related art.

The LBT failure in the related technology refers to a failure of an LBT initiated by a terminal, and specifically refers to a case where a detection result of the terminal detecting the unlicensed frequency band is that the unlicensed frequency band is not idle.

The LBT failure in this embodiment includes a failure of an LBT initiated by the terminal, and may also include a failure of an LBT initiated by the base station. The terminal can determine whether the LBT initiated by the base station fails according to a result of receiving a certain reference signal.

The reference signal may be a radio link monitor reference signal (RLM-RS) which is sent by the base station. The terminal may monitor the radio link monitor reference signal within a time window. Ideally, a wireless link monitor reference signal can be detected within a time window. If the wireless link monitor reference signal cannot be detected within one time window, it can be recorded as one LBT failure, and the LBT failure in this case is the failure of the LBT initiated by the base station.

The failure of the LBT initiated by the base station may also affect the communication quality of the terminal. For example, the terminal cannot detect the wireless link monitor reference signal, then a condition of the wireless link cannot be determined, resulting in the terminal being unable to determine which frequency band to use for communicating with the base station.

In an embodiment, the method of counting the number of failures and the number of successes for performing LBTs is not unique, and can be selected according to needs.

For example, the counting can be performed separately for LBT failures and LBT successes. If the detection result of the terminal detecting the unlicensed frequency band is that the unlicensed frequency band is not idle, it is counted as one LBT failure. If the detection result of the terminal detecting the unlicensed frequency band is that the unlicensed frequency band is idle, it is counted as one LBT success.

For example, the counting can be performed on either the LBT failures or the LBT successes, and a total number of LBTs initiated can be counted. The total number of LBTs initiated minus the number of LBT successes is the number of LBT failures. For example, if the counting is performed for the LBT successes, the detection result of the terminal detecting the unlicensed frequency band is that the unlicensed frequency band is idle, it is counted as once of LBT success, and a total number of LBTs initiated is counted. For example, if the counting is performed for the LBT failures, the detection result of the terminal detecting the unlicensed frequency band is that the unlicensed frequency band is not idle, it is counted as once of LBT failure, and the total number of LBTs initiated is counted.

At step S2, it is determined whether to trigger a preset action according to a relationship between the number of failures and the number of successes, where the preset action is used to restore a link between the terminal and the base station or to report a link problem to the base station.

In one embodiment, the relationship between the number of failures and the number of successes includes but is not limited to the following.

A size relationship between the number of failures and the number of successes, a first ratio of the number of successes to the total number of LBTs initiated, a second ratio of the number of failures to the total number of LBTs initiated, a difference value of that the number of successes minus the number of failures, a difference value of that the number of failures minus the number of successes, a ratio of the number of successes to the number of failures, and a ratio of the number of failures to the number of successes.

Since the LBT failure occurs when the unlicensed frequency band is not idle, that is, when the unlicensed frequency band is occupied by other devices, the number of failures for performing LBTs can reflect the condition that the unlicensed frequency band is occupied by other devices. The success for performing an LBT occurs when the unlicensed band is idle, that is, when the unlicensed band is not occupied by other devices, so the number of successes for performing LBTs can reflect the condition that the unlicensed frequency band is not occupied by other devices. Furthermore, according to the relationship between the number of failures and the number of successes, it can be determined whether the unlicensed frequency band is frequently occupied by other devices.

For example, take the relationship between the number of failures and the number of successes as the first ratio of the number of successes to the total number of LBTs initiated. If the first ratio is not greater than (that is, less than or equal to) a first preset ratio, it means that the unlicensed frequency band is less idle, that is, the unlicensed frequency band is frequently occupied by other devices. If the unlicensed frequency band is still used to communicate with the base station, the stability of the communication is poor.

Therefore, it can be determined that whether the unlicensed frequency band is frequently occupied by other devices according to the relationship between the number of failures and the number of successes, and the preset action can be triggered when the unlicensed frequency band is frequently occupied by other devices. The preset action is configured to restore a link between the terminal and the base station, or used to report a link problem to the base station. The restoration of the link between the terminal and the base station can enable the terminal to communicate with the base station effectively through the restored link. Reporting the link problem to the base station can enable the base station to learn that there is a problem with the communication link used by the terminal. Thus, the base station can subsequently restore the link with the terminal, or notify the terminal to establish a communication link with another base station, so that the terminal can communication with the base station effectively. Accordingly, by triggering a preset action, the stability of the communication between the terminal and the base station can be ensured.

Figure 2:
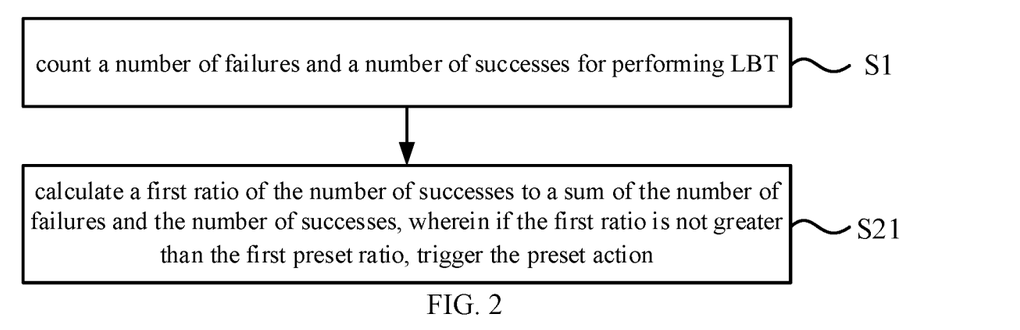
FIG. 2 is a flowchart illustrating another method of processing an LBT failure according to an example of the present disclosure.

FIG. 2 is a flowchart illustrating another method of processing an LBT failure according to an example of the present disclosure. As shown in FIG. 2, determining whether to trigger the preset action according to the relationship between the number of failures and the number of successes includes the following step.

At step S21, a first ratio of the number of successes to a sum of the number of failures and the number of successes is calculated, wherein if the first ratio is not greater than the first preset ratio, the preset action is triggered.

In one embodiment, the sum of the number of failures and the number of successes is the total number of LBTs initiated. If the first ratio is not greater than the first preset ratio, it means that the unlicensed band is less idle, that is, the unlicensed band is frequently is occupied by other devices. If the unlicensed frequency band is still used to communicate with the base station, the stability of the communication is poor. Therefore, a preset action can be triggered to ensure the stability of the communication between the terminal and the base station.

Figure 3:
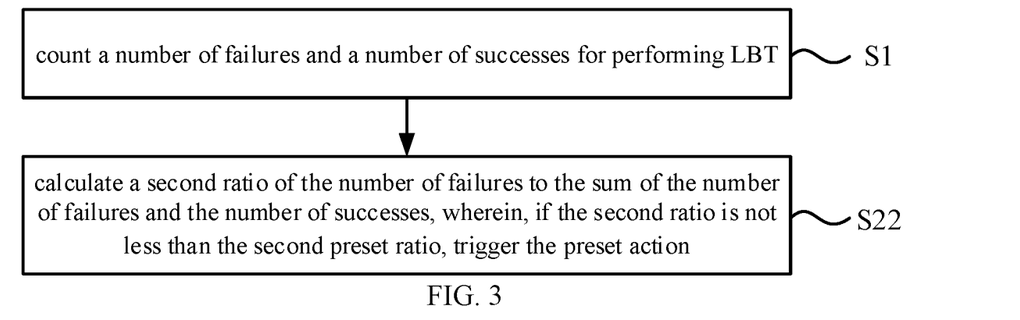
FIG. 3 is a flowchart illustrating still another method of processing an LBT failure according to an example of the present disclosure.

FIG. 3 is a flowchart illustrating still another method of processing an LBT failure according to an example of the present disclosure. As shown in FIG. 3, determining whether to trigger the preset action according to the relationship between the number of failures and the number of successes includes the following step.

At step S22, a second ratio of the number of failures to the sum of the number of failures and the number of successes is calculated, wherein, if the second ratio is not less than (that is, greater than or equal to) the second preset ratio, the preset action is triggered.

In one embodiment, the sum of the number of failures and the number of successes is the total number of LBTs initiated. If the second ratio is not less than the second preset ratio, it means that the unlicensed frequency band is less idle, that is, the unlicensed frequency band is frequently occupied by other devices. If the unlicensed frequency band is still used to communicate with the base station, the stability of the communication is poor. Therefore, a preset action can be triggered to ensure the stability of the communication between the terminal and the base station.

Figure 4:
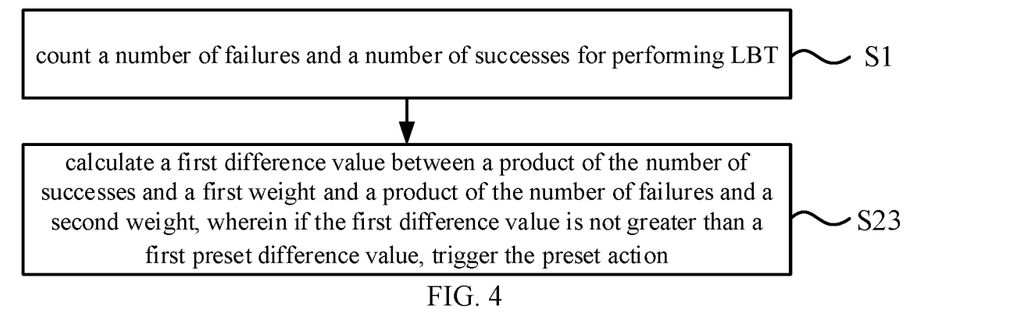
FIG. 4 is a flowchart illustrating still another method of processing an LBT failure according to an example of the present disclosure.

FIG. 4 is a flowchart illustrating still another method of processing an LBT failure according to an example of the present disclosure. As shown in FIG. 4, determining whether to trigger the preset action according to the relationship between the number of failures and the number of successes includes the following step.

At step S23, a first difference value between a product of the number of successes and a first weight and a product of the number of failures and a second weight is calculated, wherein if the first difference value is not greater than a first preset difference value, the preset action is triggered.

In one embodiment, the first weight can be set for the number of successes, and the second weight can be set for the number of failures, and the first difference value between the product of the number of successes and the first weight and the number of failures and the second weight can be calculated, and whether to trigger the preset action can be determined according to the first difference value.

The first weight and the second weight are positive numbers and can be equal or not equal. For example, the first weight and the second weight are both equal to 1, then the first difference value is the difference value between the number of successes and the number of failures.

If the first difference value is not greater than the second difference value, it means that the unlicensed frequency band is less idle, that is, the unlicensed frequency band is frequently occupied by other devices. If the unlicensed frequency band is still used to communicate with the base station, the stability of the communication is poor. Therefore, a preset action can be triggered to ensure the stability of the communication between the terminal and the base station.

Figure 5:
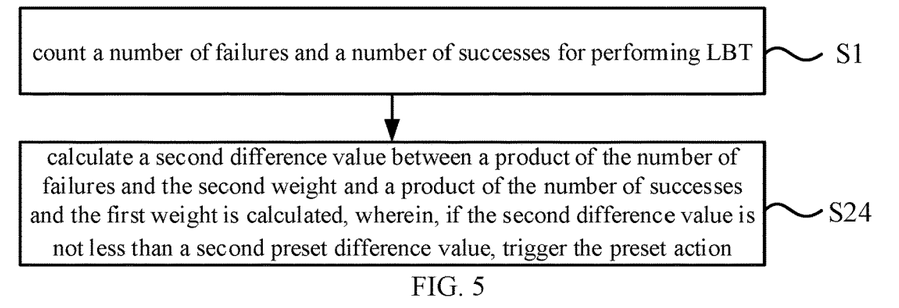
FIG. 5 is a flowchart illustrating still another method of processing an LBT failure according to an example of the present disclosure.

FIG. 5 is a flowchart illustrating still another method of processing an LBT failure according to an example of the present disclosure. As shown in FIG. 5, determining whether to trigger the preset action according to the relationship between the number of failures and the number of successes includes the following step.

At step S24, a second difference value between a product of the number of failures and the second weight and a product of the number of successes and the first weight is calculated, wherein, if the second difference value is not less than a second preset difference value, the preset action is triggered.

In one embodiment, the first weight can be set for the number of successes, and the second weight can be set for the number of failures, so that the second difference value between the product of the number of failures and the second weight and the number of successes and the first weight can be calculated, and whether to trigger the preset action can be determined according to the second difference value.

The first weight and the second weight are positive numbers and can be equal or not equal. For example, the first weight and the second weight are both equal to 1, then the second difference value is the difference value between the number of failures and the number of successes.

If the second difference value is not less than the second preset difference value, it means that the unlicensed frequency band is less idle, that is, the unlicensed frequency band is frequently occupied by other devices. If the unlicensed frequency band is still used to communicate with the base station, the stability of the communication is poor. Therefore, a preset action can be triggered to ensure the stability of the communication between the terminal and the base station.

Since in the embodiments shown in FIG. 4 and FIG. 5, the relationship between the number of failures and the number of successes is determined by calculating a difference value, while in the embodiments shown in FIG. 2 and FIG. 3, the relationship between the number of failures and the number of successes is determined by calculating a ratio. For a computer, calculating the difference value is easier than calculating the ratio. Therefore, compared to determining the relationship between the number of failures and the number of successes based on the embodiments shown in FIG. 2 or FIG. 3, determining the relationship between the number of failures and the number of successes based on the embodiments shown in FIG. 4 or FIG. 5 can simplify the calculation process of the computer.

It should be noted that the first preset ratio, the second preset ratio, the first preset difference value, and the second preset difference value can be set according to specific values. The first preset ratio and the second preset ratio are non-negative numbers, the first preset difference value and the second preset difference value may be positive, negative, or zero.

In one embodiment, the LBT includes an LBT performed for uplink operation. Since the uplink operation is generally initiated by a user equipment, the LBT may be initiated by the terminal as the user equipment.

In an embodiment, a type of the uplink operation includes at least one of the following:

uplink transmitting a scheduling request, random access (for example, a first message MSG1 randomly accessed by the uplink transmission, a third message MSG3 randomly accessed by the uplink transmission), uplink transmitting data, uplink feeding back information (such as acknowledge (ACK) and non-acknowledge (NACK)), uplink transmitting a channel sounding reference signal (SRS), uplink transmitting a channel quality indicator (CQI).

Figure 6:
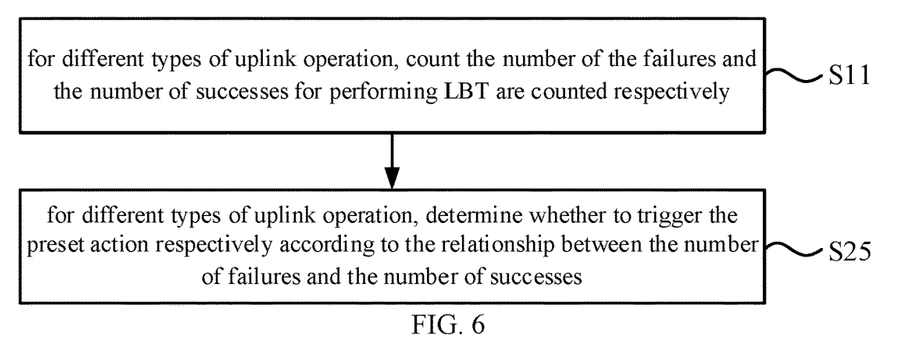
FIG. 6 is a flowchart illustrating still another method of processing an LBT failure according to an example of the present disclosure.

FIG. 6 is a flowchart illustrating still another method of processing an LBT failure according to an example of the present disclosure. As shown in FIG. 6, for different types of uplink operations, counting the number of the failures and the number of successes for performing LBTs include:

At step S11, for each type of uplink operation, the number of the failures and the number of successes for performing LBTs are counted;

determining whether to trigger the preset action according to the relationship between the number of failures and the number of successes includes the following step.

At step S25, for each type of uplink operation, whether to trigger the preset action is determined respectively according to the relationship between the number of failures and the number of successes.

In one embodiment, it is necessary to perform LBT on the unlicensed frequency band every time an uplink operation is performed, and for different types of uplink operation, the requirements for the stability of the unlicensed frequency band may be different.

Reflected on the relationship between the number of failures and the number of successes, the size relationships between the number of failures and the number of successes may be different, so for different types of uplink operation, different relationships between the number of failures and the number of successes can be preset. Taking the first preset ratio of the number of successes to the total number of LBTs initiated as an example, for different types of uplink operation, different first preset ratios can be set, for example, for random access, the first preset ratio is larger, and for the uplink transmission channel sounding reference signal, the first preset ratio is smaller.

According to this embodiment, for different types of uplink operation, the relationship between the number of failures and the number of successes can be preset, and for different types of uplink operation, the number of failures for performing LBTs and the number of successes for performing LBTs can be counted respectively; for different types of uplink operation, whether to trigger a preset action is determined according to the relationship between the number of failures and the number of successes. For example, the type of uplink operation is random access, a larger first preset ratio and is compared with the first ratio. For another example, the type of the uplink operation is the uplink transmission channel sounding reference signal, and a smaller first preset ratio can be compared with the first ratio.

Accordingly, the basis for comparison, such as the first preset ratio mentioned above, can be applied to different types of uplink operation, so that the comparison results are also applicable to different types of uplink operation, so as to accurately determine whether it is necessary to trigger the preset action for different types of uplink operation.

Figure 7:
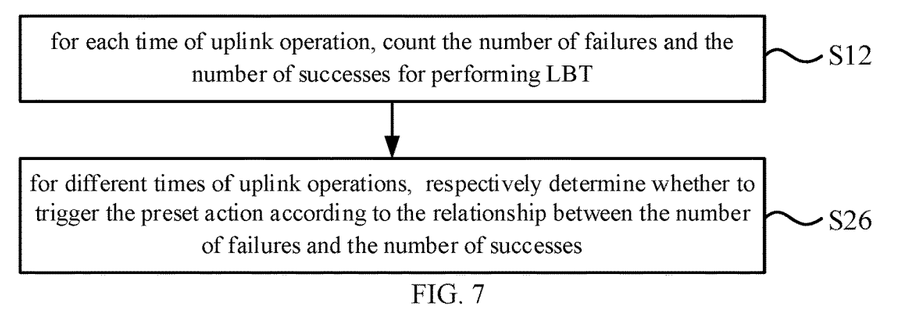
FIG. 7 is a flowchart illustrating still another method of processing an LBT failure according to an example of the present disclosure.

FIG. 7 is a flowchart illustrating still another method of processing an LBT failure according to an example of the present disclosure. As shown in FIG. 7, for different times of uplink operations, counting the number of failures and the number of successes for performing LBTs includes the following step.

At step S12, for each time of uplink operation, the number of failures and the number of successes for performing LBTs are counted.

determining whether to trigger the preset action according to the relationship between the number of failures and the number of successes includes the following step.

At step S26, for each time of uplink operation, whether to trigger the preset action is determined according to the relationship between the number of failures and the number of successes.

In one embodiment, every time an uplink operation is performed, the unlicensed frequency band needs to be performed with LBT first, and for different times of uplink operation, the requirements for the stability of the unlicensed frequency band may be different.

Reflected on the relationship between the number of failures and the number of successes, the size relationships between the number of failures and the number of successes may be different, so for different times of uplink operations, different relationships between the number of failures and the number of successes can be preset. Taking the first preset ratio of the number of successes to the total number of LBTs initiation as an example, for different times of uplink operations, different first preset ratios can be set, for example, for the first uplink operation (for example, uplink transmission scheduling request), the first preset ratio is relatively large, and for the second uplink operation, the first preset ratio is relatively small.

According to this embodiment, for different times of uplink operations, the relationship between the number of failures and the number of successes can be preset, and for different times of uplink operations, the number of failures and the number of successes of LBT can be counted respectively; and then for different times of uplink operations, it is determined whether to trigger a preset action according to the relationship between the number of failures and the number of successes. For example, for the first time of uplink operation, a larger first preset ratio can be compared with the first ratio, for another example, for the second time of uplink operation, a smaller first preset ratio is compared with the first ratio.

Accordingly, the basis for comparison, such as the first preset ratio mentioned above, can be applied to different times of uplink operations, so that the comparison results are also applicable to different times of uplink operations, so as to accurately determine whether it is necessary to trigger the preset action for different times of uplink operations.

In one embodiment, the LBT includes an LBT for performing a downlink operation.

In an embodiment, the downlink operation at least includes:

downlink transmission wireless link monitor reference signal.

Figure 8:
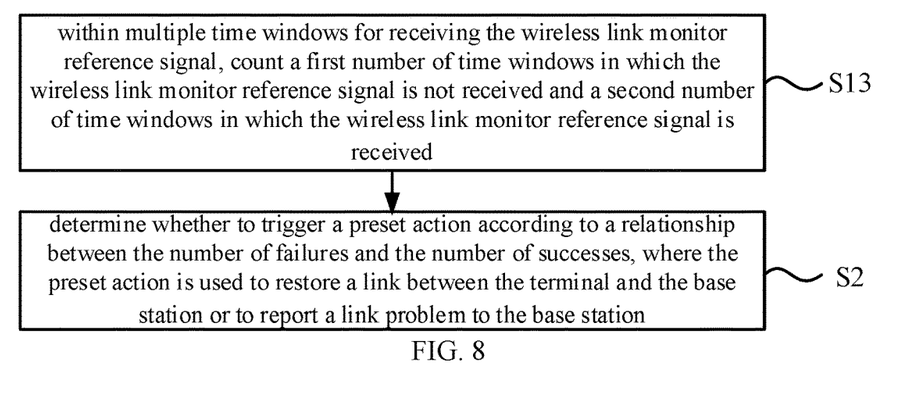
FIG. 8 is a flowchart illustrating still another method of processing an LBT failure according to an example of the present disclosure.

FIG. 8 is a flowchart illustrating still another method of processing an LBT failure according to an example of the present disclosure. As shown in FIG. 8, counting the number of failures and the number of successes for performing LBTs includes the following step.

At step S13, within multiple time windows for receiving the wireless link monitor reference signal, a first number of time windows in which the wireless link monitor reference signal is not received and a second number of time windows in which the wireless link monitor reference signal is received are counted.

The first number is determined as the number of failures for performing LBTs, and the second number is determined as the number of successes for performing LBTs.

The LBT failed in this embodiment includes the LBT initiated by the terminal, and may also include the LBT initiated by the base station. The terminal can determine whether the LBT initiated by the base station fails according to the result of receiving a certain reference signal.

The reference signal may be a wireless link monitor reference signal which is sent by the base station. The terminal may monitor the wireless link monitor reference signal within a time window. Ideally, a wireless link monitor reference signal can be detected within a time window. If the wireless link monitor reference signal cannot be detected within one time window, then it can be recorded as once of LBT failure, and the LBT failure in this case is the failure of the LBT initiated by the base station. Accordingly, within multiple time windows for receiving the wireless link monitor reference signal, a first number of time windows in which the wireless link monitor reference signal is not received and a second number of time windows in which the wireless link monitor reference signal is received may be counted; and the first number is determined as the number of failures for performing LBTs, and the second number is determined as the number of successes for performing LBTs.

The failure of the LBT initiated by the base station may also affect the communication quality of the terminal. For example, if the terminal cannot detect the wireless link monitor reference signal, a condition of the wireless link cannot be determined, resulting in the terminal being unable to determine which frequency band to use to communicate with the base station.

In an example, the preset action includes at least one of the following:

sending a request to the base station for re-establishing a communication connection, transmitting a report of wireless link failure to the base station, and initiating random access to the base station.

The terminal can restore the link between the terminal and the base station by sending a request to the base station for re-establishing a communication connection, transmitting a report of wireless link failure to the base station, and initiating random access to the base station, so that the terminal can communicate with the base station effectively through the restored link.

Figure 9:
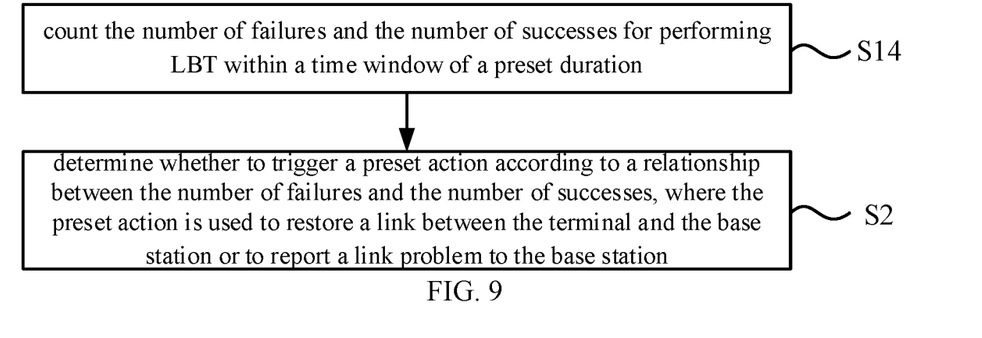
FIG. 9 is a flowchart illustrating still another method of processing an LBT failure according to an example of the present disclosure.

FIG. 9 is a flowchart illustrating still another method of processing an LBT failure according to an example of the present disclosure. As shown in FIG. 9, counting the number of failures and the number of successes for performing LBTs includes the following step.

At step S14, the number of failures and the number of successes for performing LBTs within a time window of a preset duration are counted.

If the number of failures and the number of successes for performing LBTs are counted every time an LBT is performed, there may be fluctuations in the counting results.

Take the relationship between the number of failures and the number of successes as the first ratio of the number of successes to the total number of LBTs initiated. If the first preset ratio is 1/2, the result of counting 100 times of LBT is 50 LBT successes. and 50 LBT failures. In this case, the first ratio is equal to 1/2, which is not greater than the first preset ratio, the preset action is triggered. If the result of the 101st LBT is a success for performing LBTs, then the first ratio is equal to 51/101, which is greater than the first preset ratio, and the preset action is not triggered. If the result of the 102nd LBT is an LBT failure, then the first ratio is equal to 51/102, which is equal to the first preset ratio, and the preset action is triggered.

It can be seen that due to fluctuations in the counting results, such as fluctuations in the relationship between the first ratio and the first preset ratio, the terminal frequently switches between triggering the preset action and not triggering the preset action, which is not conducive to the stable operation of the terminal.

In one embodiment, the number of failures and the number of successes for performing LBTs within a time window of a preset duration can be counted. Accordingly, it is not necessary to count the number of failures and the number of successes for performing LBTs every time LBT is performed, so that the fluctuations in the counting results can be avoided, thereby preventing the terminal from frequently switching between triggering the preset action and not triggering the preset action, which is conducive to the stable operation of the terminal.

Figure 10:
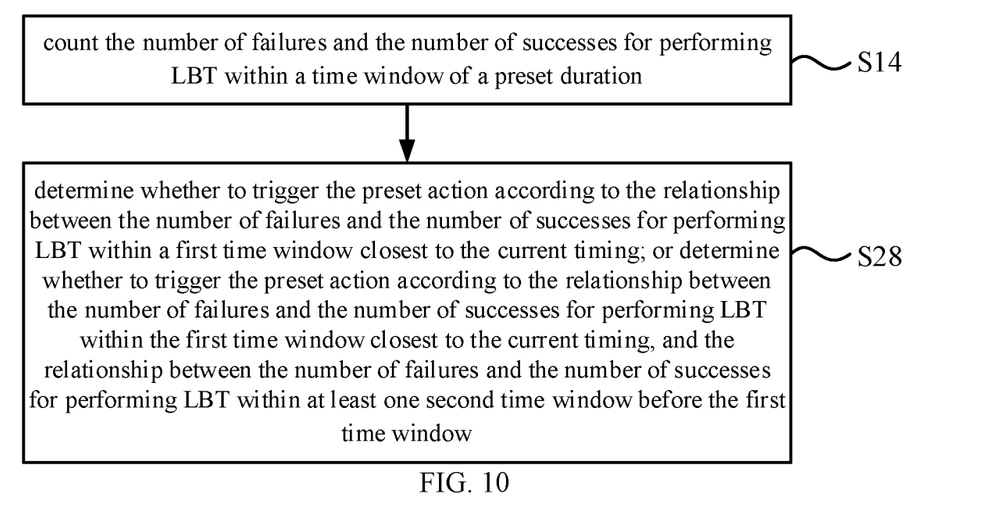
FIG. 10 is a flowchart illustrating still another method of processing an LBT failure according to an example of the present disclosure.

FIG. 10 is a flowchart illustrating still another method of processing an LBT failure according to an example of the present disclosure. As shown in FIG. 10, determining whether to trigger the preset action according to the relationship between the number of failures and the number of successes includes the following step.

At step S28, whether to trigger the preset action is determined according to the relationship between the number of failures and the number of successes for performing LBTs within a first time window closest to the current timing; or whether to trigger the preset action is determined according to the relationship between the number of failures and the number of successes for performing LBTs within the first time window closest to the current timing, and the relationship between the number of failures and the number of successes for performing LBTs within at least one second time window before the first time window.

In one embodiment, in the case of counting the number of failures and the number of successes for performing LBTs within a time window of a preset duration, only one time window may be considered, for example, for a first time window closest to the current timing may be considered. The current timing may be within the first time window, so that whether to trigger the preset action is determined according to the relationship between the number of failures and the number of successes for performing LBTs within the first time window.

In one embodiment, based on counting the number of failures and the number of successes for performing LBTs within a time window of a preset duration, not only one time window can be considered, but multiple time windows can be integrated to determine whether to trigger the preset action based on the relationship between the number of failures and the number of successes. For the relationship between the number of failures and the number of successes in each time window, a corresponding weight can be set, then the relationships of the number of successes for the multiple time windows are weighted and summed.

Take a second time window as an example. For example, the first ratio obtained based on the number of failures and the number of successes counted within the first time window is a, and the weight corresponding to the first time window is p. The first ratio of the number of failures and the number of successes counted within the second time window is b, and the weight corresponding to the second time window is 1−p, so the relationships between the number of failures and the number of successes for performing LBTs within the multiple time windows can be determined based on the result of a weighted sum, that is, ap+b(1−p).

Accordingly, the relationships between the number of failures and the number of successes for performing LBTs within the multiple time windows can be combined to determine whether to trigger the preset action, which expands the time range for determining whether to trigger the preset action, which is beneficial to ensure the accuracy of determining whether to trigger the preset action.

Corresponding to the above examples of the method of processing LBT failures, the present disclosure also provides examples of the apparatus for processing LBT failures.

Figure 11:
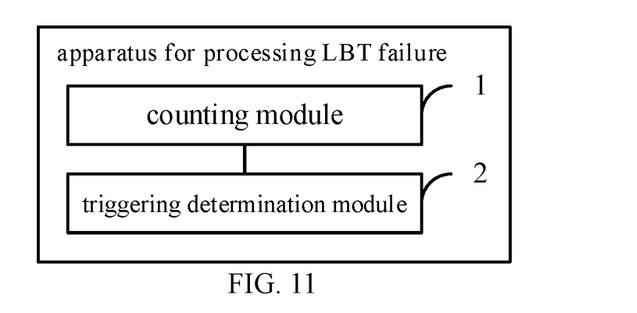
FIG. 11 is a block diagram illustrating an apparatus for processing an LBT failure according to an example of the present disclosure.

FIG. 11 is a block diagram illustrating an apparatus for processing an LBT failure according to an example of the present disclosure. The apparatus for processing an LBT failure shown in this embodiment can be applied to a terminal, the terminal can be a mobile phone, a tablet computer, a wearable device or an electronic device, the terminal can be used as a user equipment to communicate with a base station, wherein the terminal can communicate with a base station based on NR technology.

As shown in FIG. 11, the apparatus for processing an LBT failure may include:

a counting module 1, configured to count a number of failures and a number of successes for performing LBTs;

a triggering determination module 2, configured to determine whether to trigger a preset action according to a relationship between the number of failures and the number of successes, wherein the preset action is used to restore a link between the terminal and a base station or report a link problem to the base station.

In an embodiment, the triggering determination module 2 is configured to calculate a first ratio of the number of successes to a sum of the number of failures and the number of successes, wherein in response to that the first ratio is not greater than a first preset ratio, trigger the preset action.

In an embodiment, the triggering determination module 2 is configured to calculate a second ratio of the number of failures to a sum of the number of failures and the number of successes, wherein in response to that the second ratio is not less than a second preset ratio, trigger the preset action.

In an embodiment, the triggering determination module 2 is configured to calculate a first difference value between a first product of the number of successes and a first weight and a second product of the number of failures and a second weight, wherein in response to that the first difference value is not greater than a first preset difference value, trigger the preset action.

In an embodiment, the triggering determination module 2 is configured to calculate a second difference value between a second product of the number of failures and a second weight and a first product of the number of success and a first weight, wherein in response to that the second difference value is not greater than a second preset difference value, trigger the preset action.

In an embodiment, the LBT includes an LBT performed for an uplink operation.

In an embodiment, a type of the uplink operation includes at least one of the following:

uplink transmitting a scheduling request, random access, uplink transmitting data, uplink feeding back information, uplink transmitting a channel sounding reference signal, or uplink transmitting a channel quality indicator.

In an embodiment, for different types of uplink operation, the counting module 1 is configured to, count, for each type of uplink operation, the number of failures and the number of successes for performing the LBTs;

the triggering determination module 2 is configured to, determine, for each type of uplink operation, whether to trigger the preset action according to the relationship between the number of failures and the number of successes.

In an embodiment, for different times of uplink operations, the counting module 1 is configured to, count for each time of uplink operation, the number of failures and the number of successes for performing the LBTs;

the triggering determination module 2 is configured to, determine, for each time of uplink operation, whether to trigger the preset action according to the relationship between the number of failures and the number of successes.

In an embodiment, the LBT includes an LBT performed for a downlink operation.

In an embodiment, the downlink operation at least includes:

downlink transmitting a wireless link monitor reference signal.

In an embodiment, the counting module 1 is configured to, count, within a plurality of time windows for receiving the wireless link monitor reference signal, a first number of time windows in which the wireless link monitor reference signal is not received and a second number of time windows in which the wireless link monitor reference signal is received;

wherein, the first number is determined as the number of failures for performing LBTs, and the second number is determined as the number of successes for performing LBTs.

In an embodiment, the preset action includes at least one of the following:

sending a request to the base station for re-establishing a communication connection, transmitting a report of wireless link failure to the base station, and initiating random access to the base station.

In an embodiment, the counting module 1 is configured to count the number of failures and the number of successes of LBT within a time window of a preset duration.

In an embodiment, the triggering determination module 2 is configured to determine whether to trigger the preset action according to a relationship between a number of failures for performing LBTs and a number of successes for performing LBTs within a first time window closest to a current timing; or determine whether to trigger the preset action according to a relationship between a number of failures and a number of successes for performing LBTs within the first time window closest to the current timing, and the relationship between the number of failures and the number of successes for performing LBTs within at least one second time window before the first time window.

A specific manner of performing an operation by each module of the apparatus in the above example is described in detail in the relevant method examples, which will not be described in detail herein.

Since the apparatus examples substantially correspond to the method examples, a reference may be made to part of the descriptions of the method examples for the related part. The apparatus example described above is merely illustrative, where the modules described as the separate component may or may not be physically separate, and the component shown as a module may or may not be a physical unit, i.e., may be located in one place or may be distributed to a plurality of network elements. Some or all of the modules may be selected according to actual needs to achieve the objective of the solution of the embodiment. Those of ordinary skill in the art may understand and carry out them without creative work.

An example of the present disclosure further provides an electronic device, including:

a processor, and memory for storing instructions executable by the processor;

wherein the processor is configured to perform steps in the method of processing an LBT failure according to any of the above embodiments.

An example of the present disclosure further provides a computer readable storage medium storing a computer program, wherein the computer program is executed by a processor to perform steps in the method of processing an LBT failure according to any of the above embodiments.

Figure 12:
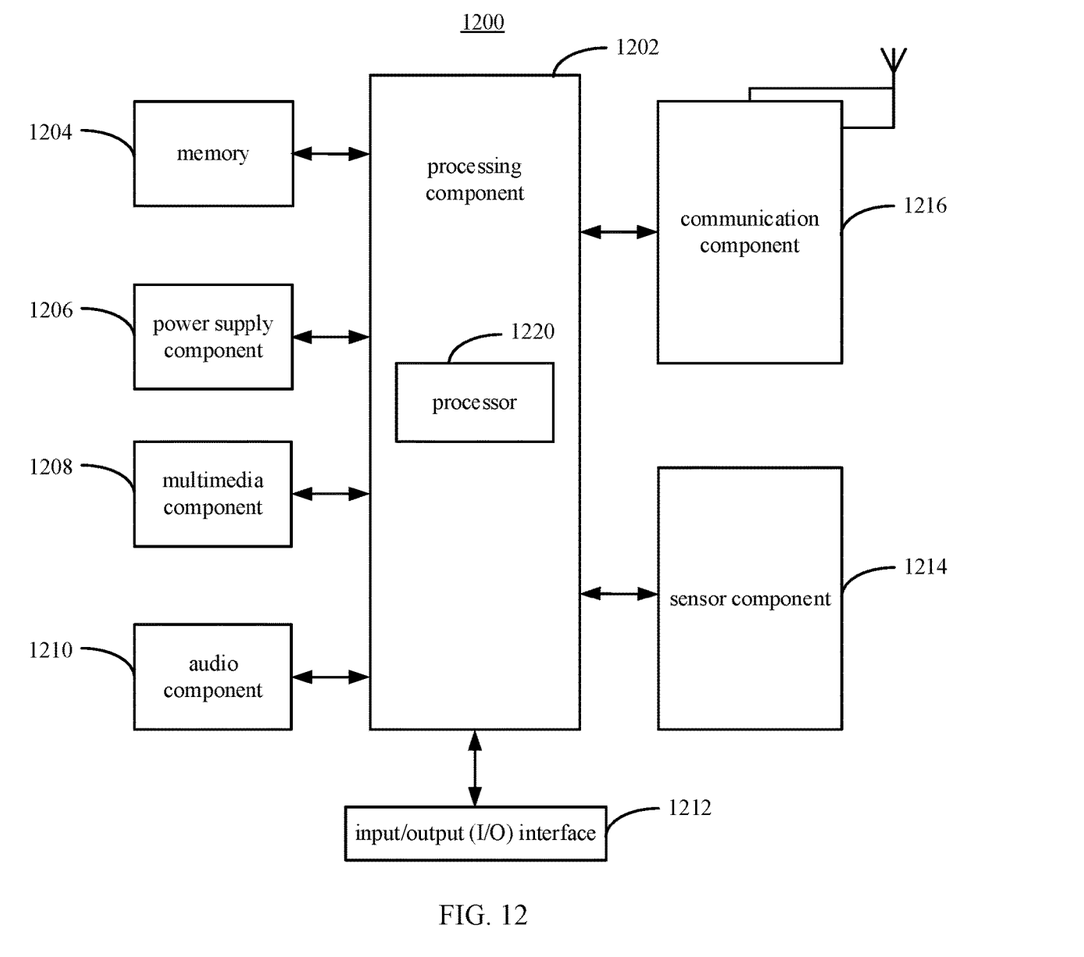
FIG. 12 is a block diagram illustrating an apparatus for processing an LBT failure according to some embodiments of the present disclosure.

FIG. 12 is a block diagram illustrating an apparatus 1200 for processing an LBT failure according to an example of the present disclosure. For example, the apparatus 1200 may be a mobile phone, a computer, a digital broadcast terminal, a message transceiver, a game console, a tablet device, a medical device, a fitness device, a personal digital assistant, and so on.

As shown in FIG. 12, the apparatus 1200 may include one or more of the following components: a processing component 1202, memory 1204, a power supply component 1206, a multimedia component 1208, an audio component 1210, an input/output (I/O) interface 1212, a sensor component 1214 and a communication component 1216.

The processing component 1202 generally controls the overall operation of the apparatus 1200, such as operations associated with display, phone call, data communication, camera operation, and recording operation. The processing component 1202 may include one or more processors 1220 for executing instructions to complete all or a part of blocks of the above method. In addition, the processing component 1202 may include one or more modules to facilitate the interaction between the processing component 1202 and other components. For example, the processing component 1202 may include a multimedia module to facilitate the interaction between the multimedia component 1208 and the processing component 1202.

The memory 1204 is configured to store different types of data to support operation at the apparatus 1200. Examples of such data include instructions for any application or method that operates on the apparatus 1200, contact data, phonebook data, messages, pictures, videos, and so on. The memory 1204 may be implemented by any type of volatile or non-volatile memory devices or a combination thereof, such as a Static Random-Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a disk or a CD.

The power supply component 1206 may provide power for different components of the apparatus 1200. The power supply component 1206 may include a power supply management system, one or more power sources, and other components associated with generating, managing and distributing power for the apparatus 1200.

The multimedia component 1208 includes a screen providing an output interface between the apparatus 1200 and a user. In some embodiments, the screen may include a Liquid Crystal Display (LCD) and/or a Touch Panel (TP). If the screen includes a touch panel, the screen may be implemented as a touch screen to receive an input signal from a user. The touch panel includes one or more touch sensors to sense touch, slip, and gestures on the touch panel. The touch sensor may not only sense the boundary of a touch or slip operation but also detect duration and pressure relating to the touch or slip operation. In some embodiments, the multimedia component 1208 may include a front-facing camera and/or a rear camera. When the apparatus 1200 is in an operating mode, such as in a shooting mode or a video mode, the front-facing camera and/or the rear camera may receive external multimedia data. Each of the front-facing camera and the rear camera may be a fixed optical lens system or may be capable of focal length and optical zoom.

The audio component 1210 is configured to output and/or input an audio signal. For example, the audio component 1210 includes a microphone (MIC). When the apparatus 1200 is in an operating mode, for example, in a call mode, a recording mode or a speech recognition mode, the microphone is configured to receive an external audio signal. The received audio signal may be further stored in the memory 1204 or sent via the communication component 1216. In some embodiments, the audio component 1210 also includes a speaker for outputting an audio signal.

The I/O interface 1212 provides an interface between the processing component 1202 and a peripheral interface module. The peripheral interface module may be a keyboard, click wheel, a button and the like. Such buttons may include but not limited to: a home button, a volume button, a start button, and a lock button.

The sensor component 1214 includes one or more sensors for evaluating states of the apparatus 1200 in different aspects. For example, the sensor component 1214 may detect the on/off state of the apparatus 1200, and relative locations of components, for example, the component is a display and a keypad of the apparatus 700. The sensor component 1214 may also detect a position change of the apparatus 1200 or one component of the apparatus 1200, the presence or absence of contact of a user with the apparatus 1200, an orientation or acceleration/deceleration of the apparatus 1200 and a temperature change of the apparatus 1200. The sensor component 1214 may include a proximity sensor configured to detect presence of a nearby object without any physical contact. The sensor component 1214 may also include an optical sensor, such as a CMOS or CCD image sensor to be used in imaging application. In some embodiments, the sensor component 1214 may also include an acceleration sensor, a gyroscope sensor, a magnetic sensor, a pressure sensor, or a temperature sensor.

The communication component 1216 is configured to facilitate wired or wireless communication between the apparatus 1200 and other devices. The apparatus 1200 may access a wireless network based on a communication standard, such as WIFI, 2G or 3G, 4G LTE, 5G NR or a combination thereof. In some embodiments, the communication component 1216 may receive a broadcast signal or broadcast-related information from an external broadcast management system via a broadcast channel. In some embodiments, the communication component 1216 may also include a Near Field Communication (NFC) module to facilitate short-range communications. For example, the NFC module may be implemented based on Radio Frequency Identification (RFID) technology, Infrared Data Association (IrDA) technology, Ultra Wide Band (UWB) technology, Bluetooth (BT) technology and other technology.

In an example, the apparatus 1200 may be implemented by one or more application specific integrated circuits (ASIC), digital signal processors (DSP), digital signal processing devices (DSPD), programmable logic devices (PLD), field programmable gate arrays (FPGA), controllers, microcontrollers, microprocessors or other electronic elements, for executing the method in any one of the above examples.

In an example, there is also provided a non-transitory computer readable storage medium including instructions such as the memory 1204 including instructions. The above instructions may be executed by the processor 1220 of the apparatus 1200 to complete the above method. For example, the non-transitory computer readable storage medium may be a Read-Only Memory (ROM), a Random Access Memory (RAM), CD-ROM, a magnetic tape, a floppy disk, and an optical data storage device and so on.

After considering the specification and practicing the present disclosure, the persons of skill in the prior art may easily conceive of other implementations of the present disclosure. The present disclosure is intended to cover any variations, uses, modification or adaptations of the present disclosure that follow the general principles thereof and include common knowledge or conventional technical means in the art that are not disclosed in the present disclosure. The specification and examples herein are intended to be illustrative only and the real scope and spirit of the present disclosure are indicated by the claims of the present disclosure.

It is to be understood that the present disclosure is not limited to the precise structures described above and shown in the accompanying drawings and may be modified or changed without departing from the scope of the present disclosure. The scope of protection of the present disclosure is limited only by the appended claims.

It should be noted that, as used herein, relational terms such as first and second are used merely to distinguish one entity or operation from another entity or operation, and do not necessarily require or imply there is any such actual relationship or order between these entities or operations. The terms "including", "comprising" or any other variant thereof are intended to include a non-exclusive inclusion, such that a process, a method, an article, or a device including a plurality of elements includes not only those elements but also other elements not specifically listed, or elements that are inherent to such a process, a method an article, or a device. An element defined by the phrase "comprising a . . . " without further limitation does not exclude the presence of additional identical elements in the process, method, article, or device that includes the element.

The methods and apparatuses provided in the examples of the present disclosure have been described in detail above, and specific examples have been used herein to explain the principles and implementation of the present disclosure. The descriptions of the above examples are only used to help understand the method of the present disclosure and its core ideas. Moreover, for a person of ordinary skill in the art, according to the ideas of the present disclosure, there will be changes in the specific implementation and the scope of application. Accordingly, the contents of this description should not be interpreted as limitations of the present disclosure.

What is claimed is:

1. A method of processing listen before talk (LBT) failure, being applicable to a terminal, comprising:
    counting a number of failures and a number of successes for performing LBTs; and
    determining whether to trigger a preset action according to a relationship between the number of failures and the number of successes, wherein the preset action is used to restore a link between the terminal and a base station or report a link problem to the base station;
    wherein the LBT comprises an LBT performed for an uplink operation;
    wherein, for different types of uplink operations, said counting the number of failures and the number of successes for performing the LBTs comprises;
    counting, for each type of uplink operation, the number of failures and the number of successes for performing the LBTs; and
    determining whether to trigger the preset action according to the relationship between the number of failures and the number of successes copmrises;
    determining, for each type of uplink operation, whether to trigger the preset action according to the relationship between the number of failures and the number of successes.

2. The method of claim 1, wherein said determining whether to trigger the preset action according to the relationship between the number of failures and the number of successes comprises:
    calculating a first ratio of the number of successes to a sum of the number of failures and the number of successes, wherein in response to that the first ratio is not greater than a first preset ratio, triggering the preset action.

3. The method of claim 1, wherein said determining whether to trigger the preset action according to the relationship between the number of failures and the number of successes comprises:
    calculating a second ratio of the number of failures to a sum of the number of failures and the number of successes, wherein in response to that the second ratio is not less than a second preset ratio, triggering the preset action.

4. The method of claim 1, wherein said determining whether to trigger the preset action according to the relationship between the number of failures and the number of successes comprises:
    calculating a first difference value between a first product of the number of successes and a first weight and a second product of the number of failures and a second weight, wherein in response to that the first difference value is not greater than a first preset difference value, triggering the preset action.

5. The method of claim 1, wherein said determining whether to trigger the preset action according to the relationship between the number of failures and the number of successes comprises:
    calculating a second difference value between a second product of the number of failures and a second weight and a first product of the number of success and a first weight, wherein in response to that the second difference value is not greater than a second preset difference value, triggering the preset action.

6. The method of claim 1, wherein a type of the uplink operation comprises at least one of:
    uplink transmitting a scheduling request,
    random access,
    uplink transmitting data,
    uplink feeding back information,
    uplink transmitting a channel sounding reference signal, or
    uplink transmitting a channel quality indicator.

7. The method of claim 1, wherein, for different times of uplink operations,
    counting the number of failures and the number of successes for performing the LBTs comprises:
    counting, for each time of uplink operation, the number of failures and the number of successes for performing the LBTs; and
    determining whether to trigger the preset action according to the relationship between the number of failures and the number of successes comprises:
    determining, for each time of uplink operation, whether to trigger the preset action according to the relationship between the number of failures and the number of successes.

8. The method of claim 1, wherein the LBT comprises an LBT performed for a downlink operation.

9. The method of claim 8, wherein the downlink operation at least comprises:
    downlink transmitting a wireless link monitor reference signal.

10. The method of claim 9, wherein said counting the number of failures and the number of successes for performing the LBTs comprises:
    counting, within a plurality of time windows for receiving the wireless link monitor reference signal, a first number of time windows in which the wireless link monitor reference signal is not received and a second number of time windows in which the wireless link monitor reference signal is received;
    wherein, the first number is determined as the number of failures for performing the LBTs, and the second number is determined as the number of successes for performing the LBTs.

11. The method of claim 1, wherein the preset action comprises at least one of:

sending a request to the base station for re-establishing a communication connection, transmitting a report of wireless link failure to the base station, or initiating random access to the base station.

12. The method of claim 1, wherein said counting the number of failures and the number of successes for performing the LBTs comprises:

counting a number of failures and a number of successes for performing LBTs within a time window of a preset duration.

13. The method of claim 12, wherein said determining whether to trigger the preset action according to the relationship between the number of failures and the number of successes comprises:

determining whether to trigger the preset action according to a relationship between a number of failures and a number of successes for performing LBTs within a first time window closest to a current timing; or determining whether to trigger the preset action according to the relationship between the number of failures and the number of successes for performing the LBTs within the first time window closest to the current timing, and a relationship between a number of failures and a number of successes for performing LBTs within at least one second time window before the first time window.

14. A communication system implementing the method of claim 1, comprising the terminal, wherein the LBT failure occurs when an unlicensed frequency band is not idle, and as a result of the LBT failure occurring when the unlicensed frequency band is occupied by other devices, the number of failures for performing LBTs reflect a condition that the unlicensed frequency band is occupied by the other devices.

15. The communication system of claim 14, wherein a success for performing LBTs occurs when the unlicensed band is idle, and as a result of success occurring when the unlicensed band is not occupied by the other devices, the number of successes for performing LBTs reflect a condition that the unlicensed frequency band is not occupied by other devices.

16. The communication system of claim 15, wherein the system is configured to:

according to a relationship between the number of failures and the number of successes, determine whether the unlicensed frequency band is frequently occupied by the other devices, and trigger the preset action when the unlicensed frequency band is frequently occupied by other devices;

restore a link between the terminal and a base station or report a link problem to the base station;

enable the terminal to communicate with the base station effectively through the restored link;

enable the base station to learn that there is a problem with the link used by the terminal, such that the base station subsequently restores the link with the terminal, or notify the terminal to establish a communication link with another base station, thereby ensuring a stability of communication between the terminal and the base station.

17. An electronic device, comprising:

a processor, and memory for storing instructions executable by the processor;

wherein the processor is configured to perform steps of a method of processing a listen before talk (LBT) failure comprising:

counting a number of failures and a number of successes for performing LBTs; and determining whether to trigger a preset action according to a relationship between the number of failures and the number of successes, wherein the preset action is used to restore a link between the terminal and a base station or report a link problem to the base station;

wherein the LBT comprises an LBT performed for an uplink operation;

wherein, for different types of uplink operations, said counting the number of failures and the number of successes for performing the LBTs comprises;

counting, for each type of uplink operation, the number of failures and the number of successes for performing the LBTs; and determining whether to trigger the preset action according to the relationship between the number of failures and the number of successes copmrises;

determining, for each type of uplink operation, whether to trigger the preset action according to the relationship between the number of failures and the number of successes.

18. A non-transitory computer readable storage medium storing a computer program, wherein the computer program is executed by a processor to perform steps of a method of processing a listen before talk (LBT) failure comprising:

counting a number of failures and a number of successes for performing LBTs; and determining whether to trigger a preset action according to a relationship between the number of failures and the number of successes, wherein the preset action is used to restore a link between the terminal and a base station or report a link problem to the base station;

wherein the LBT comprises an LBT performed for an uplink operation;

wherein, for different types of uplink operations, said counting the number of failures and the number of successes for performing the LBTs comprises;

counting, for each type of uplink operation, the number of failures and the number of successes for performing the LBTs; and determining whether to trigger the preset action according to the relationship between the number of failures and the number of successes copmrises;

determining, for each type of uplink operation, whether to trigger the preset action according to the relationship between the number of failures and the number of successes.

* * * * *